US012638162B2

(12) United States Patent
Hanwell

(10) Patent No.: US 12,638,162 B2
(45) Date of Patent: May 26, 2026

(54) HELMET HEADLAMP ASSEMBLIES AND RELATED METHODS

(71) Applicant: Pelican Products, Inc., Torrance, CA (US)

(72) Inventor: John Edward Hanwell, Beverly Hills, CA (US)

(73) Assignee: Pelican Products, Inc., Torrance, CA (US)

( * ) Notice: Subject to any disclaimer, the term of this patent is extended or adjusted under 35 U.S.C. 154(b) by 288 days.

(21) Appl. No.: 18/585,427

(22) Filed: Feb. 23, 2024

(65) Prior Publication Data

US 2025/0271124 A1 Aug. 28, 2025

(51) Int. Cl.

| | |
|---|---|
| ***F21V 21/084*** | (2006.01) |
| ***F21S 9/02*** | (2006.01) |
| ***F21W 121/06*** | (2006.01) |
| ***F21Y 115/10*** | (2016.01) |

(52) U.S. Cl.
CPC .............. *F21V 21/084* (2013.01); *F21S 9/02* (2013.01); *F21W 2121/06* (2013.01); *F21Y 2115/10* (2016.08)

(58) Field of Classification Search
CPC ........ B60Q 1/2676; F21V 21/084; F21S 9/02; F21W 121/06; F21Y 115/10
See application file for complete search history.

(56) References Cited

U.S. PATENT DOCUMENTS

| | | | | |
|---|---|---|---|---|
| 3,309,691 A * | 3/1967 | Bonanno ................... | F21L 2/00 340/321 |
| 4,186,429 A | 1/1980 | Johnston | |
| 8,350,486 B2 * | 1/2013 | Bucalo ................. | B60Q 1/2676 362/249.05 |
| 9,194,548 B2 | 11/2015 | Gregory | |
| 2005/0066422 A1 | 3/2005 | Yan | |
| 2006/0133068 A1 | 6/2006 | Sherring | |
| 2011/0170280 A1 | 7/2011 | Soto et al. | |
| 2020/0281297 A1 | 9/2020 | Kaye et al. | |
| 2022/0412543 A1 | 12/2022 | Gagneux et al. | |

FOREIGN PATENT DOCUMENTS

JP 3141494 U 5/2008

OTHER PUBLICATIONS

Extended European Search Report dated Jul. 10, 2025, for corresponding European Application No. 25156813.5; 9 pages.

* cited by examiner

*Primary Examiner* — William J Carter
(74) *Attorney, Agent, or Firm* — Nelson Mullins Riley & Scarborough LLP

(57) ABSTRACT

A headlamp assembly is provided for attachment to a helmet shell defining front, rear, and two lateral portions. The headlamp assembly comprises a base plate, a housing, a first light source, a second light source, and a member. The base plate comprises opposing first and second ends. The base plate defines a longitudinal axis extending between the first and second ends and a transverse axis perpendicular to the longitudinal axis. The base plate is attachable to the shell with the first end of the base plate located at the front portion of the shell. The housing is releasably coupled with the base plate and defines top, front, and two lateral sides. First and second apertures are defined at the top and front sides respectively. First and second light sources are oriented to emit light through the first and second apertures respectively. The member is removably positioned over the first aperture.

20 Claims, 13 Drawing Sheets

HELMET HEADLAMP ASSEMBLIES AND RELATED METHODS

TECHNICAL FIELD

Embodiments of the present invention relate to headlamp assemblies, for example for attachment to a helmet, such as a sports or safety helmet.

BACKGROUND

Many different configurations of headlamps and flashlights are known. Additionally, various headlamp and flashlight brackets are known for mounting a headlamp or flashlight to a helmet. However, known headlamps and flashlights that can be attached to helmets typically do not have a slim form factor, are more limited in their versatility than is desirable, and may suffer an inability to work properly under certain environmental conditions.

SUMMARY

In one embodiment, the present invention provides a headlamp assembly for attachment to a helmet. The helmet comprises a shell defining a front portion, a rear portion, and two lateral portions separating the front portion from the rear portion. The headlamp assembly comprises a base plate, a housing, a first light source, a second light source, and a member. The base plate comprises a first end and an opposite second end. The base plate also defines a longitudinal axis extending between the first end and the second end as well as a transverse axis perpendicular to the longitudinal axis. The base plate is configured to be attached to the shell with the first end of the base plate located at the front portion of the shell. The housing is releasably coupled with the base plate. The housing defines a top side spaced apart from the base plate. The housing also defines a first lateral side, a second lateral side opposite the first lateral side, and a front side. The top side defines a first aperture, and the front side defines a second aperture. The front side is located at the first end of the base plate. The first light source is coupled with the housing, and the first light source is oriented to emit light through the first aperture away from the base plate. The second light source is disposed within the housing, and the second light source is oriented to emit light through the second aperture away from the headlamp assembly. The member is removably positioned on the top side of the housing and disposed over the first aperture.

In some embodiments, the base plate may define a bottom surface and a top surface, and the bottom surface may have a first curvature corresponding to a second curvature of the exterior surface of the shell. Additionally, in some embodiments, bottom edges of the first lateral side, the second lateral side, and the front side of the housing may be disposed against the top surface of the base plate when the housing is releasably coupled with the base plate.

In some embodiments, the base plate may also comprise a body portion, a first arm, and a second arm. The second arm may be positioned opposite the first arm, and the first arm and second arm may each extend laterally outward of the body portion proximate to the first end of the base plate. Additionally, in some embodiments, the base plate may be curved relative to a plane containing the longitudinal axis and the transverse axis. Furthermore, in some embodiments, the housing may be tapered from a first portion located at the first end of the base plate to a second portion located at the second end of the base plate. In some embodiments, the headlamp assembly may be tapered along the first arm and along the second arm.

In some embodiments, the member may comprise first indicia, and the member may be translucent in some embodiments. The member may be disposed in a recess defined in the top side of the housing. Additionally, in some embodiments, the housing may also comprise a first light source cover hingedly connected with the housing proximate to the top side of the housing to selectively cover the member disposed in the recess, and the housing may also comprise a second light source cover releasably coupled with the housing proximate to the front side of the housing and disposed over the second aperture.

In accordance with another embodiment, the present invention provides a headlamp assembly for attachment to a helmet. The headlamp assembly comprises a base plate, a housing, a first light source, a second light source, and a member. The base plate comprising a periphery, and the periphery defines a first end and an opposite second end. The base plate also defines a longitudinal axis extending between the first end and the second end as well as a transverse axis perpendicular to the longitudinal axis. The periphery of base plate conforms to a contour of the helmet. The headlamp assembly also defines a first plane containing the longitudinal axis and the transverse axis, a second plane extending perpendicularly to the first plane and containing the longitudinal axis, and a third plane extending perpendicularly to the first and second planes. The housing is releasably coupled with the base plate, and the housing defines a top side spaced apart from the base plate as well as a front side extending between the top side and the first end of the base plate. The first light source is coupled with the housing, and the first light source has a first facing direction that is perpendicular to the first plane. The second light source is disposed between the housing and the base plate, and the second light source has a second facing direction that is perpendicular to the third plane. Additionally, the member is removably coupled with the housing and disposed over the first light source.

In some embodiments, the headlamp assembly may also comprise a third light source disposed between the housing and the base plate, and the third light source may be positioned proximate the second end of the base plate. Additionally, in some embodiments, the first and second light sources each comprise distinct light emitting diodes (LEDs) or arrays of LEDs.

In some embodiments, the housing may also define a first lateral side and a second lateral side, and the housing may also comprise a first locking arm coupled with the first lateral side and a second locking arm coupled with the second lateral side. Additionally, in some embodiments, the base plate may comprise a first slot and a second slot, the first locking arm may define a first tab, and the second locking arm may define a second tab. The first and second locking arms may be moveable relative to the housing between a first position and a second position. At the first position, the first and second locking arms are adjacent the respective first and second lateral sides, the first tab is disposed in the first slot, and the second tab is disposed in the second slot. At the second position, the first and second locking arms are spaced apart from the respective first and second lateral sides and the first and second tabs are not disposed in the respective first and second slots. Furthermore, in some embodiments, the front side of the housing and the first end of the base plate may be curved with respect to the third plane. In some embodiments, the base plate periphery may also define first and second lateral sides each extending between the first end and second end, the second end may be rounded, and the first and second lateral sides may be inwardly curved toward the second plane.

According to a still further embodiment, the present invention provides a method of attaching a headlamp assembly to a helmet. The method comprises providing a headlamp assembly. This headlamp assembly comprises a base plate, a housing, and a first light source. The base plate comprises a first end and an opposite second end, and the base plate defines a longitudinal axis extending between the first end and the second end and a transverse axis perpendicular to the longitudinal axis. The headlamp assembly also comprises and defines a first plane containing the longitudinal axis and the transverse axis, a second plane extending perpendicularly to the first plane and containing the longitudinal axis, and a third plane extending perpendicularly to the first and second planes. The housing defines a top side and a front side, with the top side comprising an internal surface facing the base plate and an external surface opposite the internal surface. The front side extends between the top side and the first end of the base plate. The first light source is also coupled with the housing, and the first light source has a first facing direction that is perpendicular to the first plane. In addition, the method comprises attaching the base plate to the helmet with the first end of the base plate located at a front portion of the helmet, coupling a second light source with an interior surface of the housing, and coupling the housing with the base plate such that the second light source has a second facing direction that is perpendicular to the third plane.

BRIEF DESCRIPTION OF THE DRAWINGS

Figure 1:
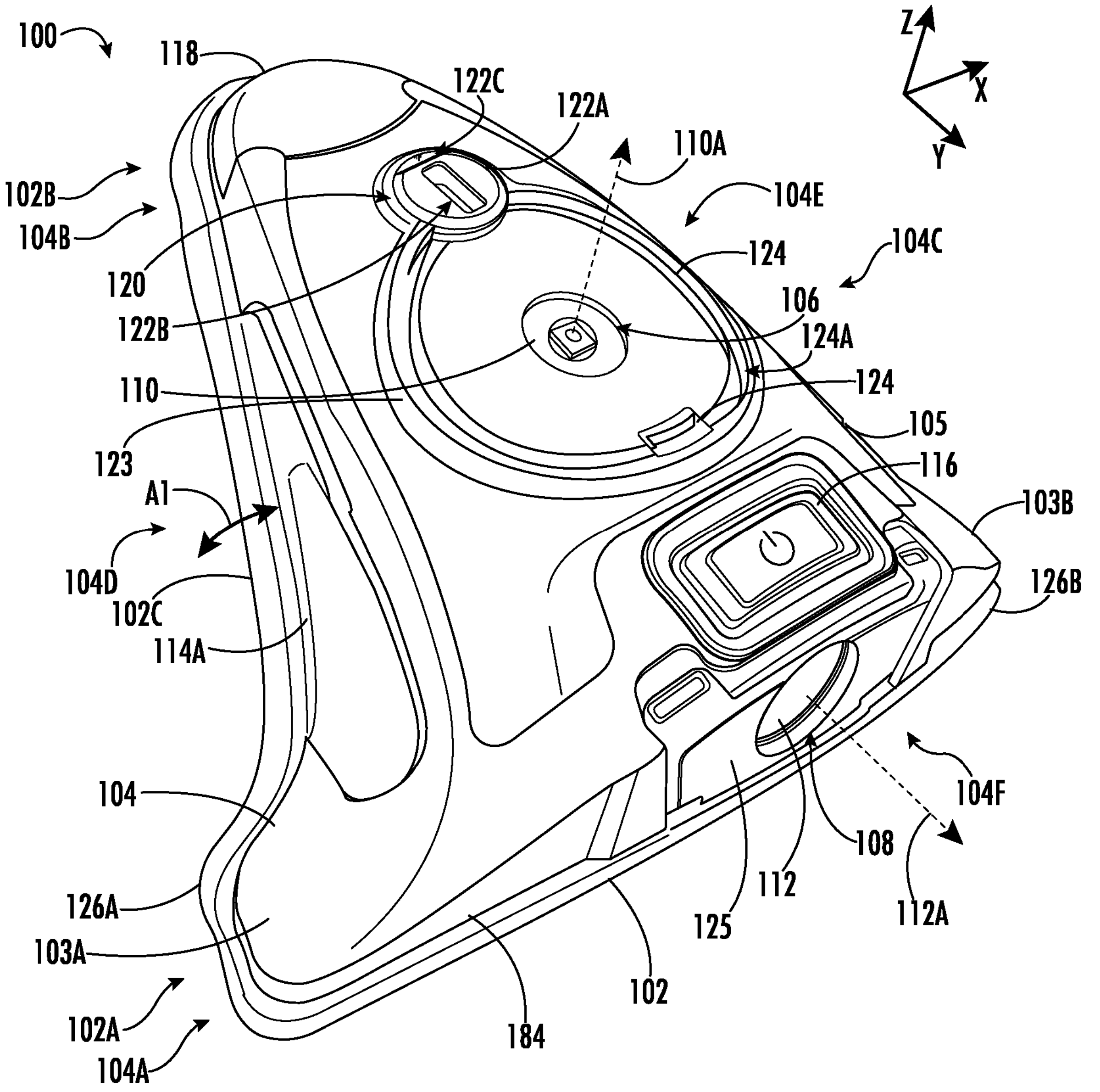
Figure 2:
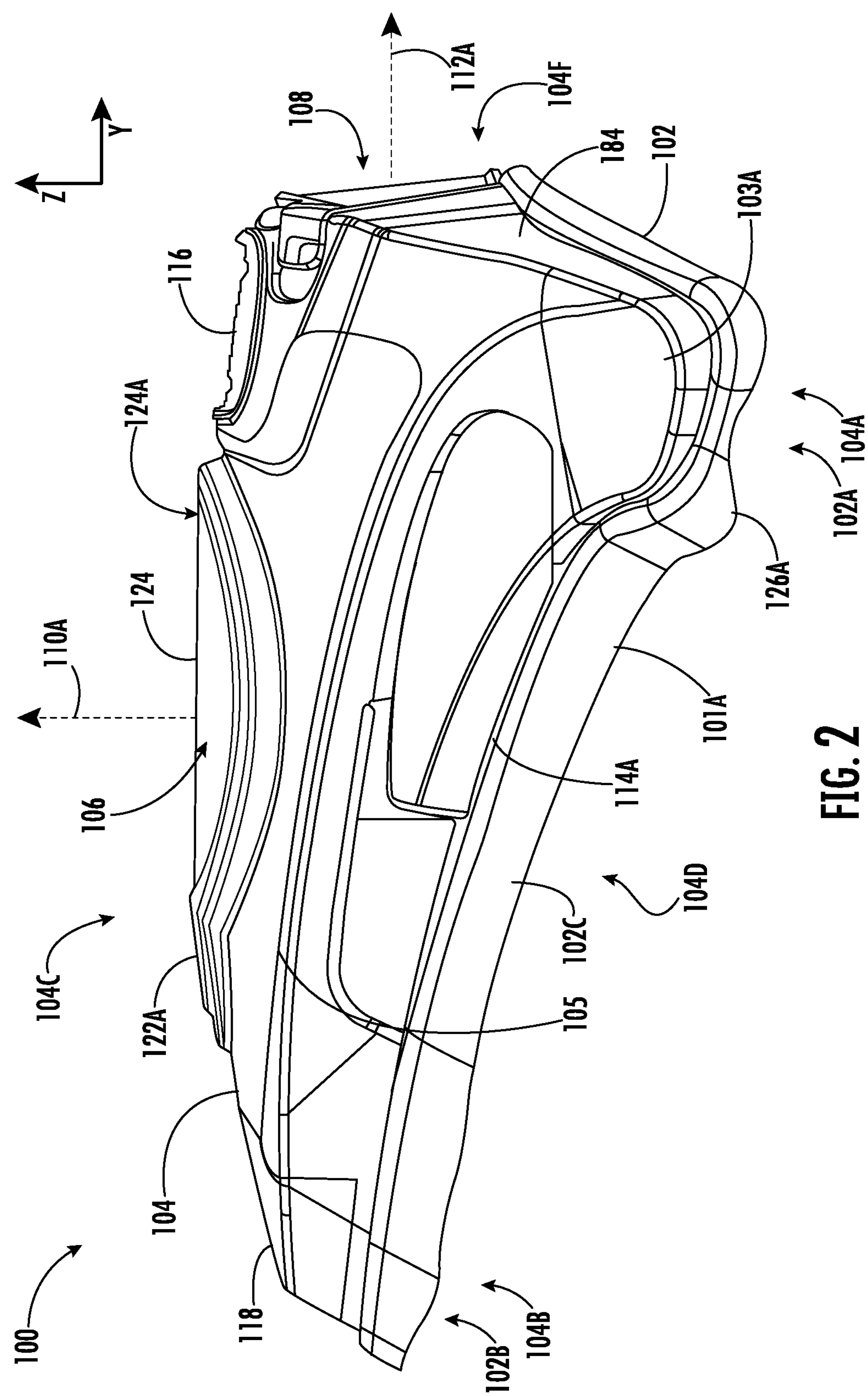
Figure 3:
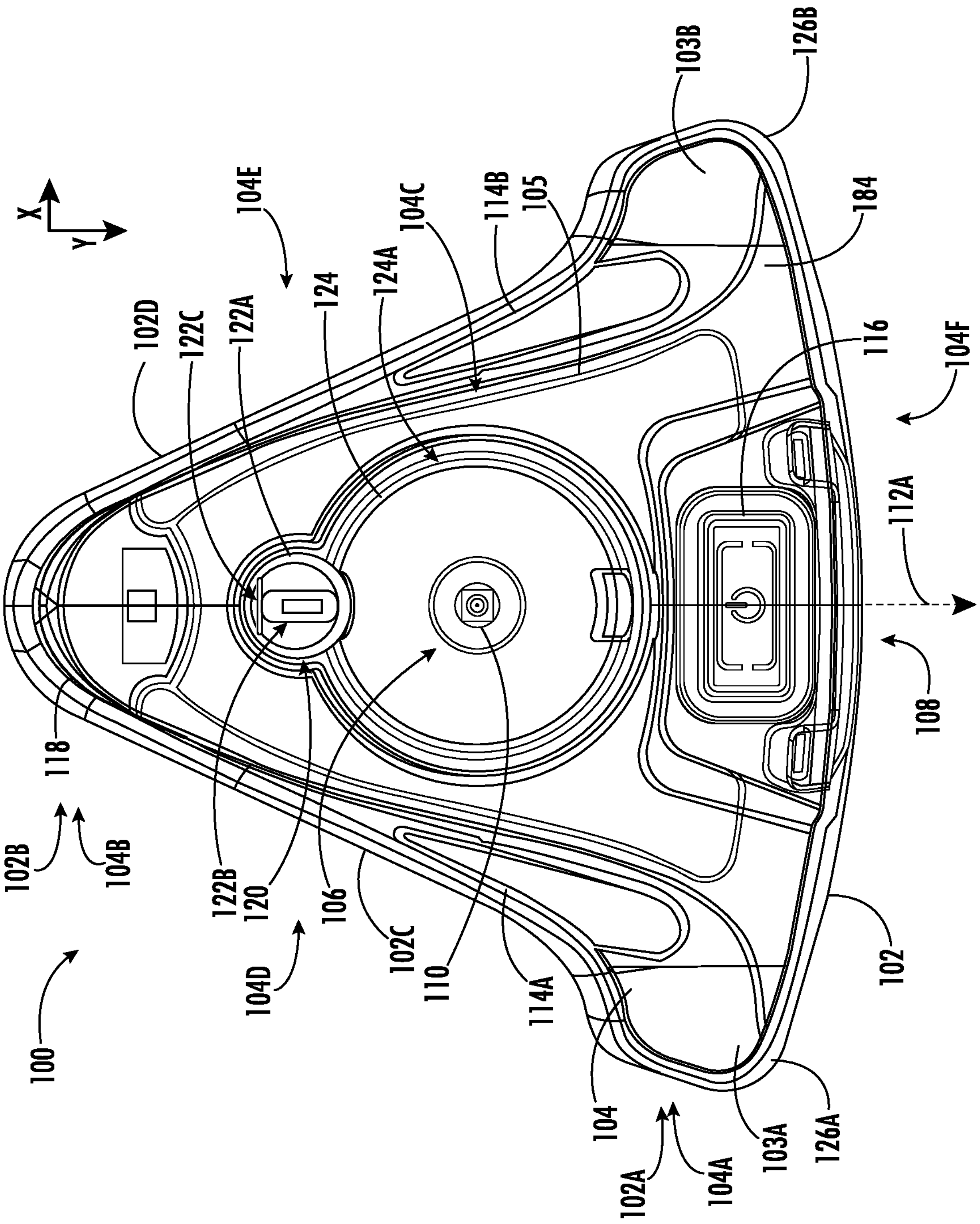
Figure 4:
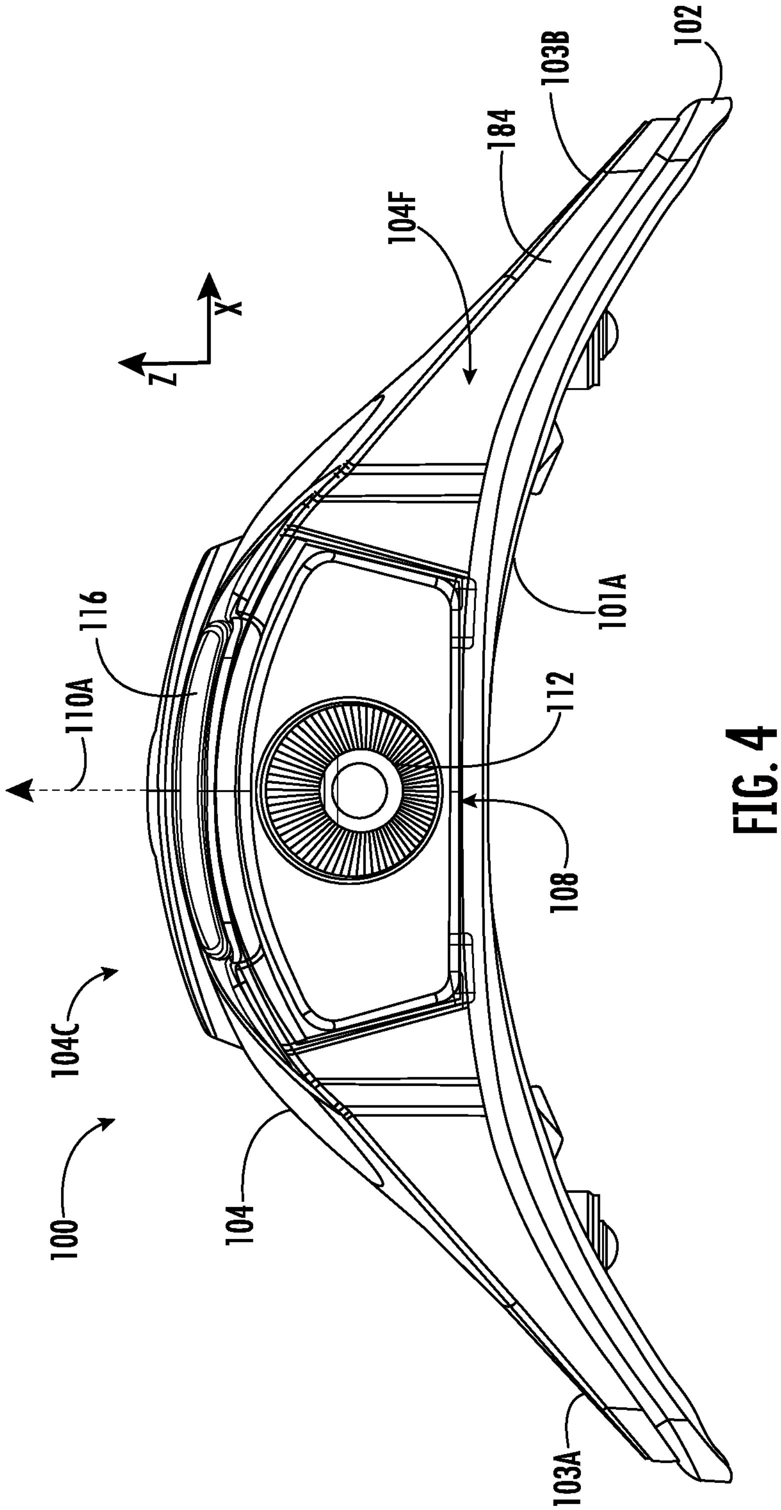
Figure 5:
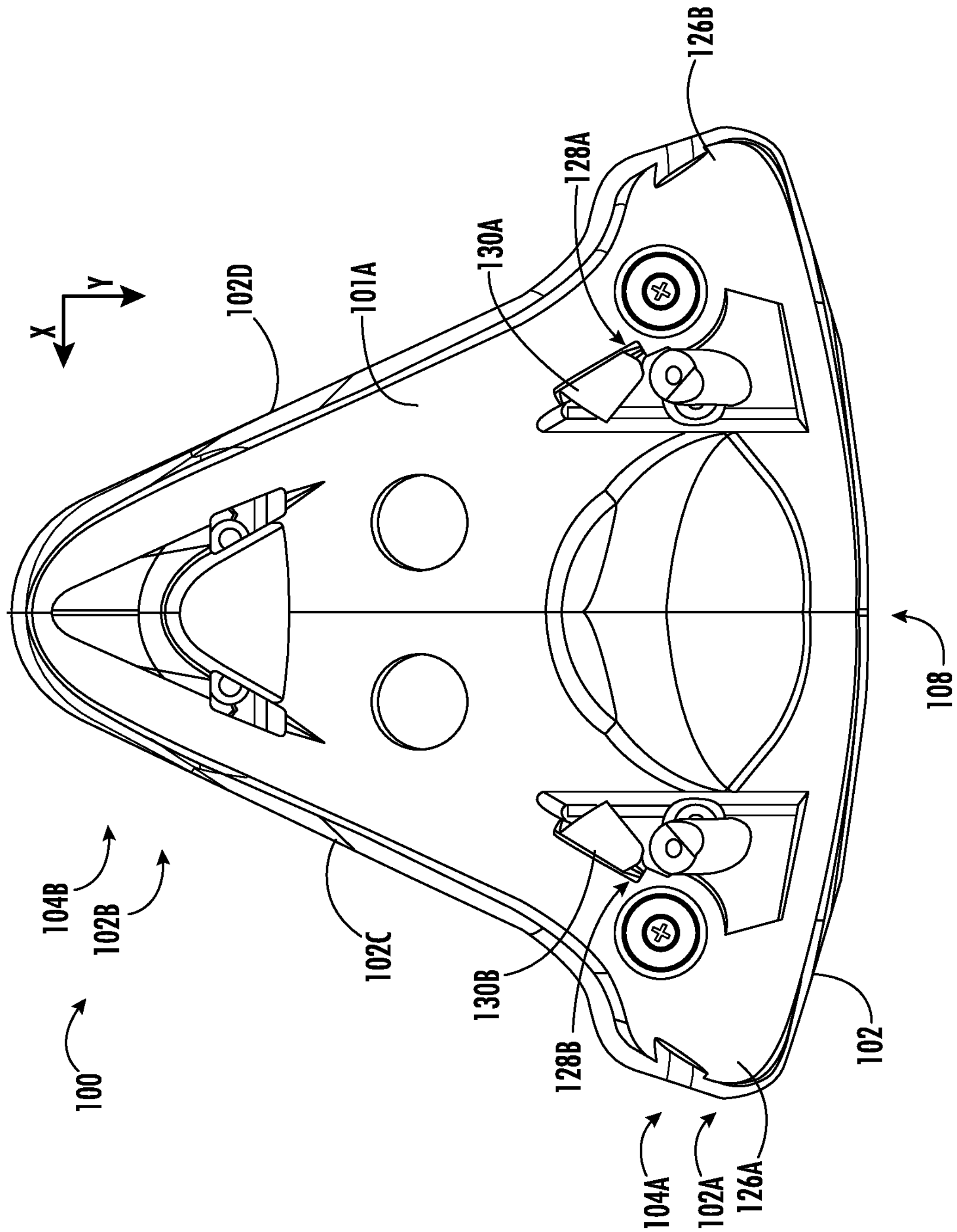
Figure 6:
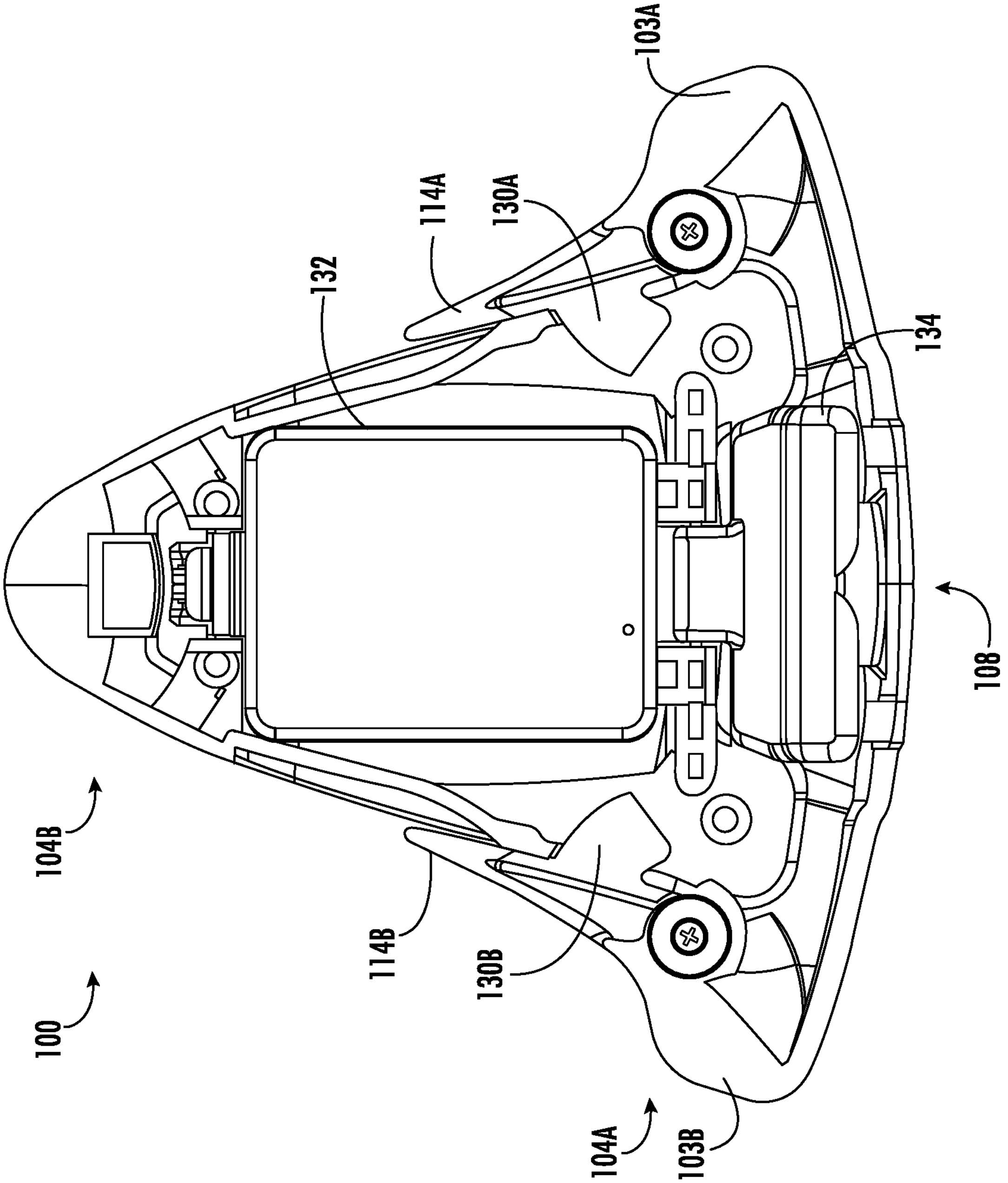
Figure 7:
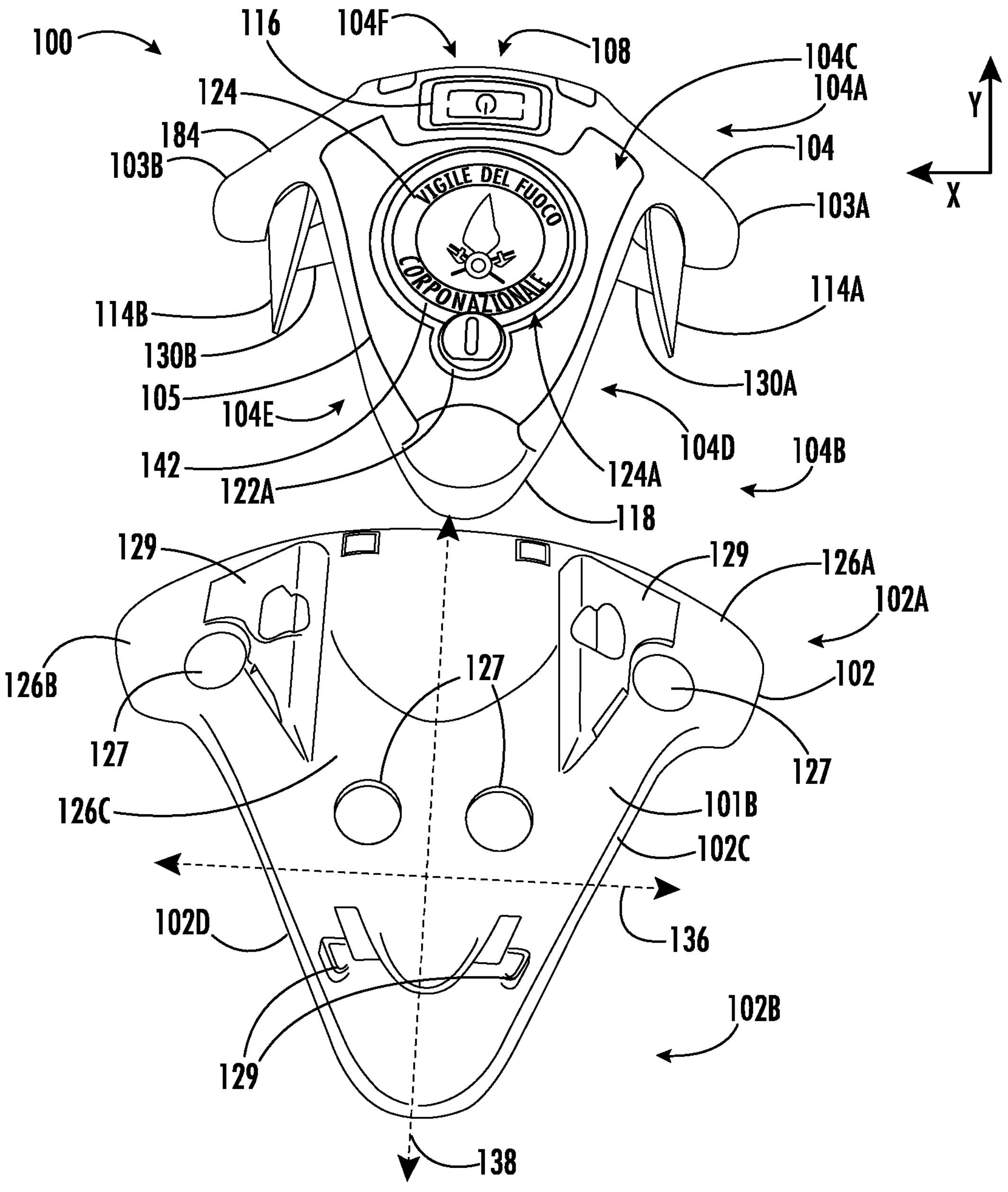
Figure 8:
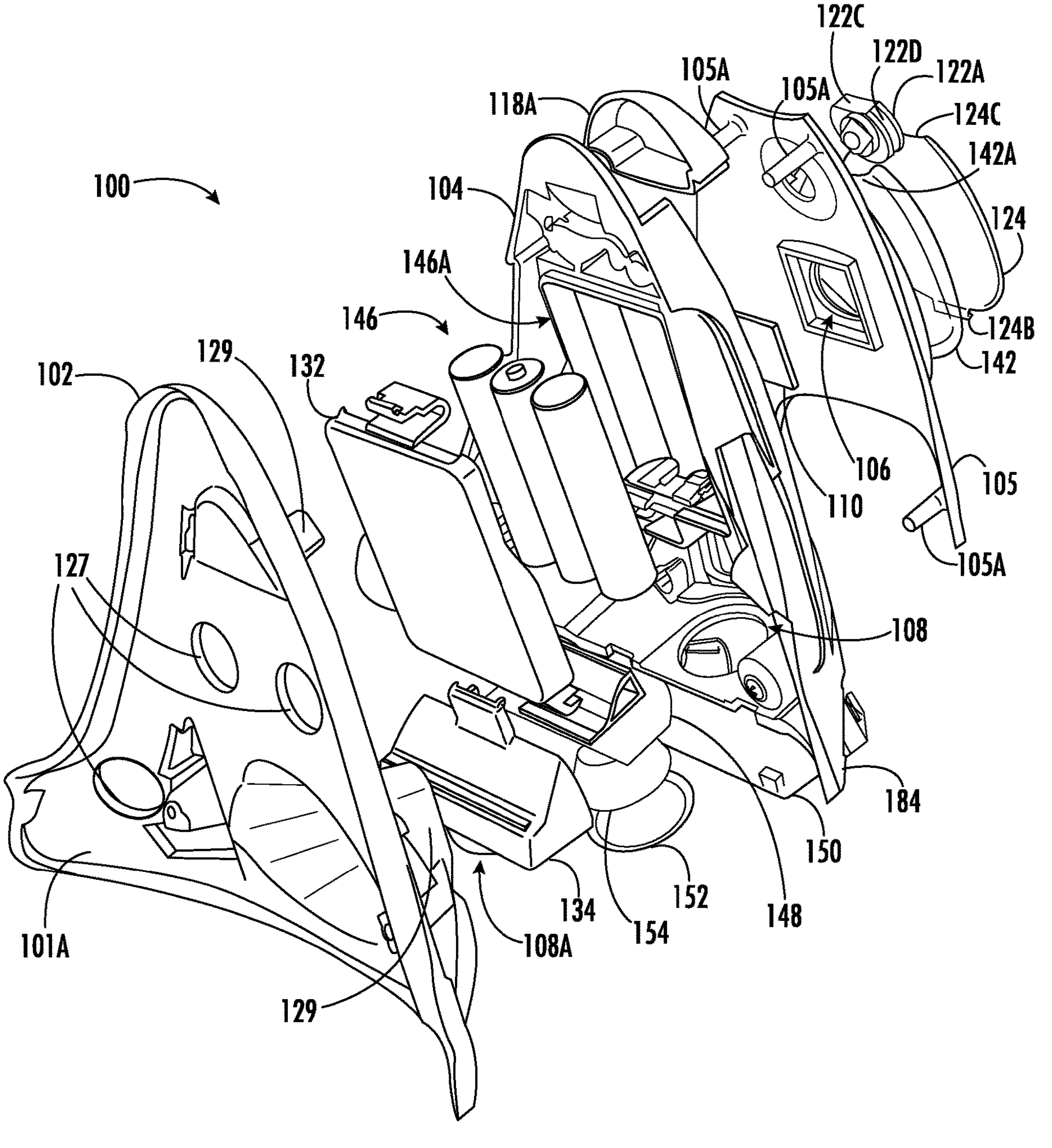
Figure 9:
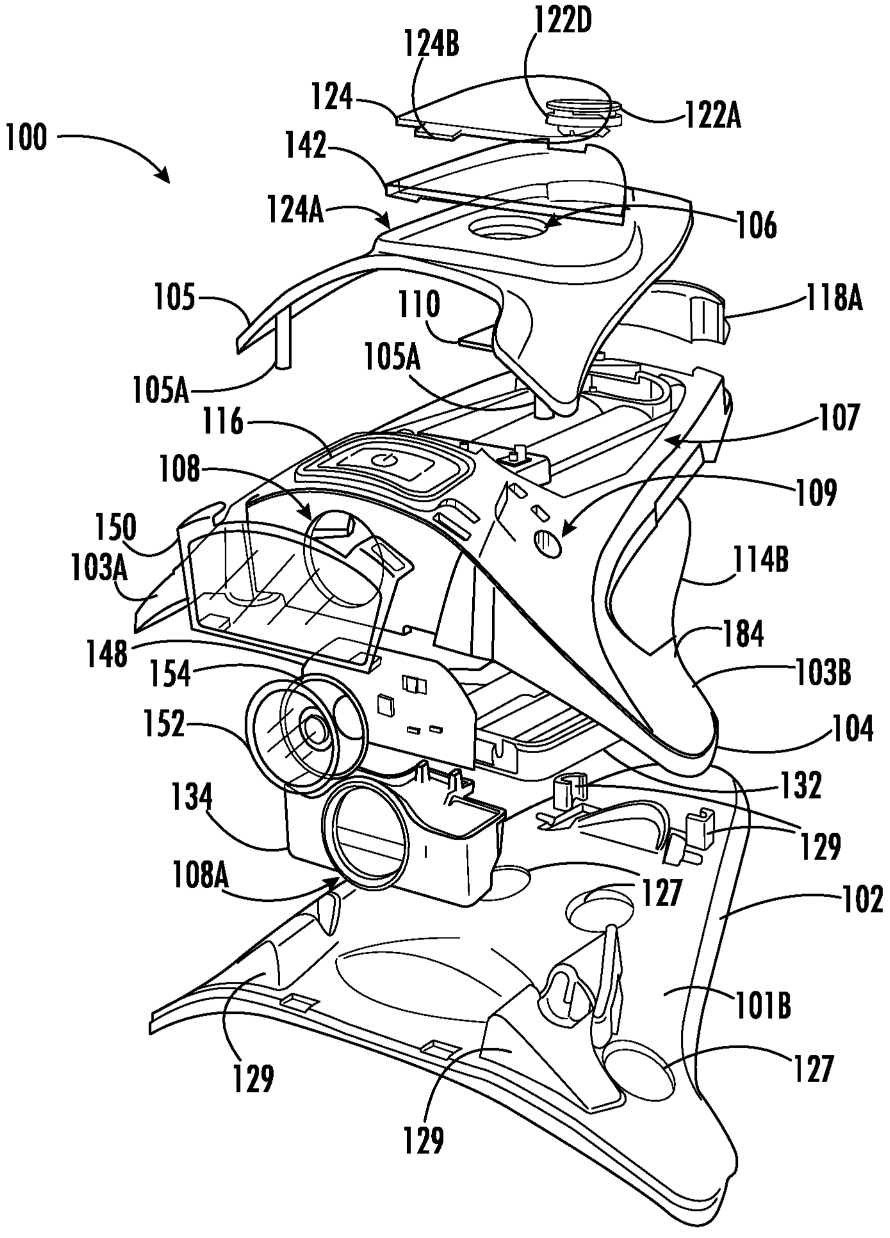
Figure 10:
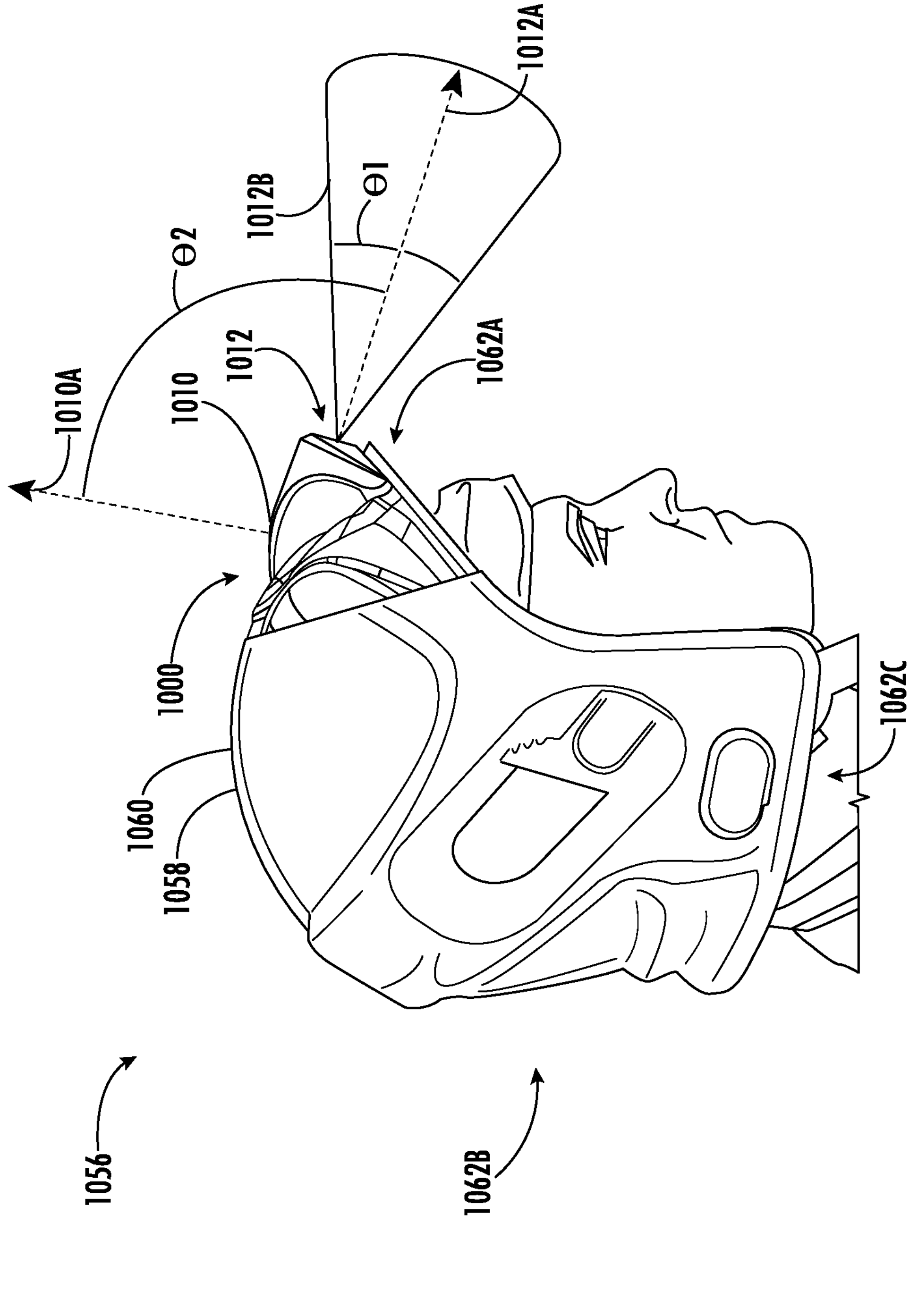
Figure 11:
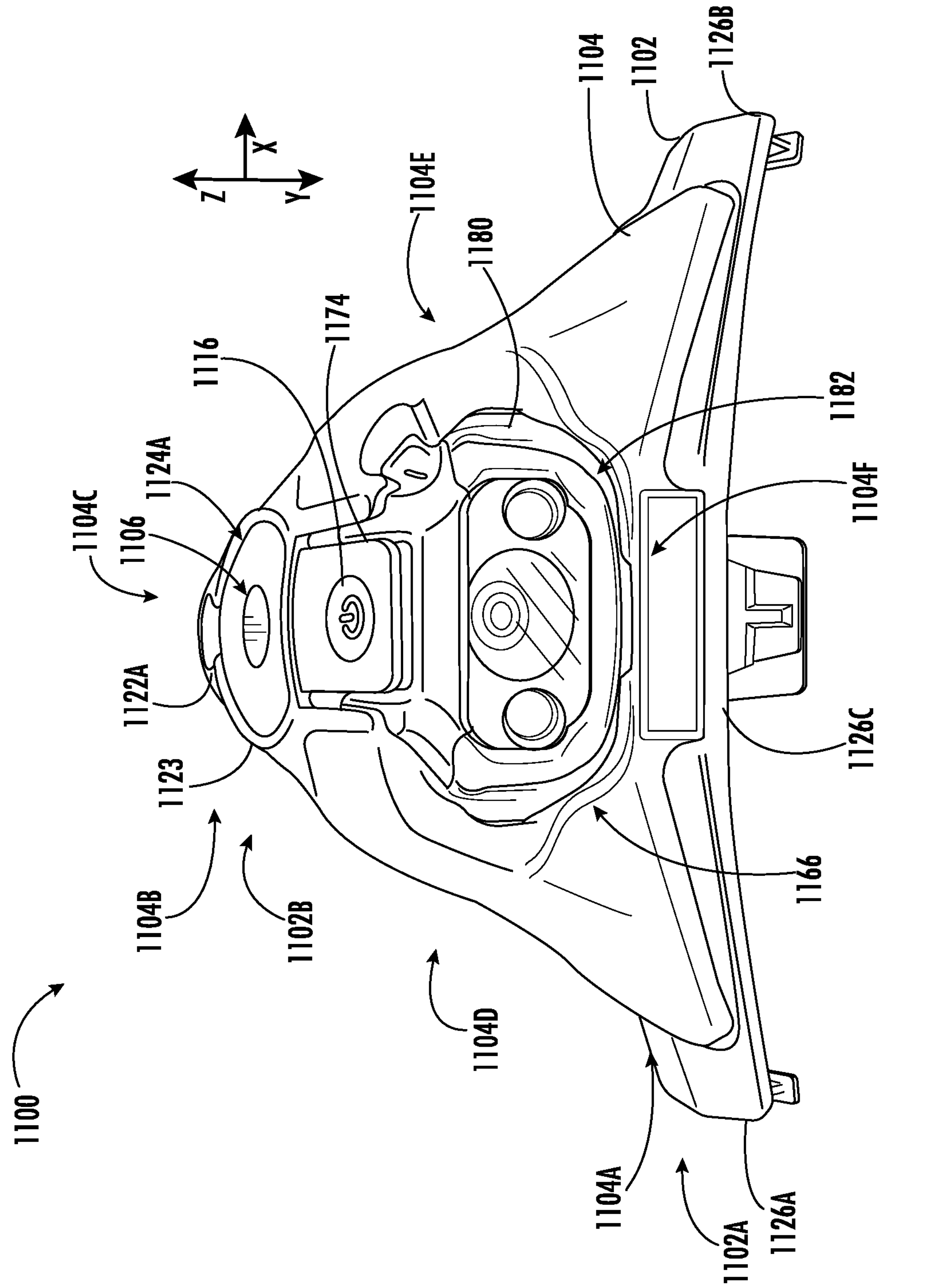
Figure 12:
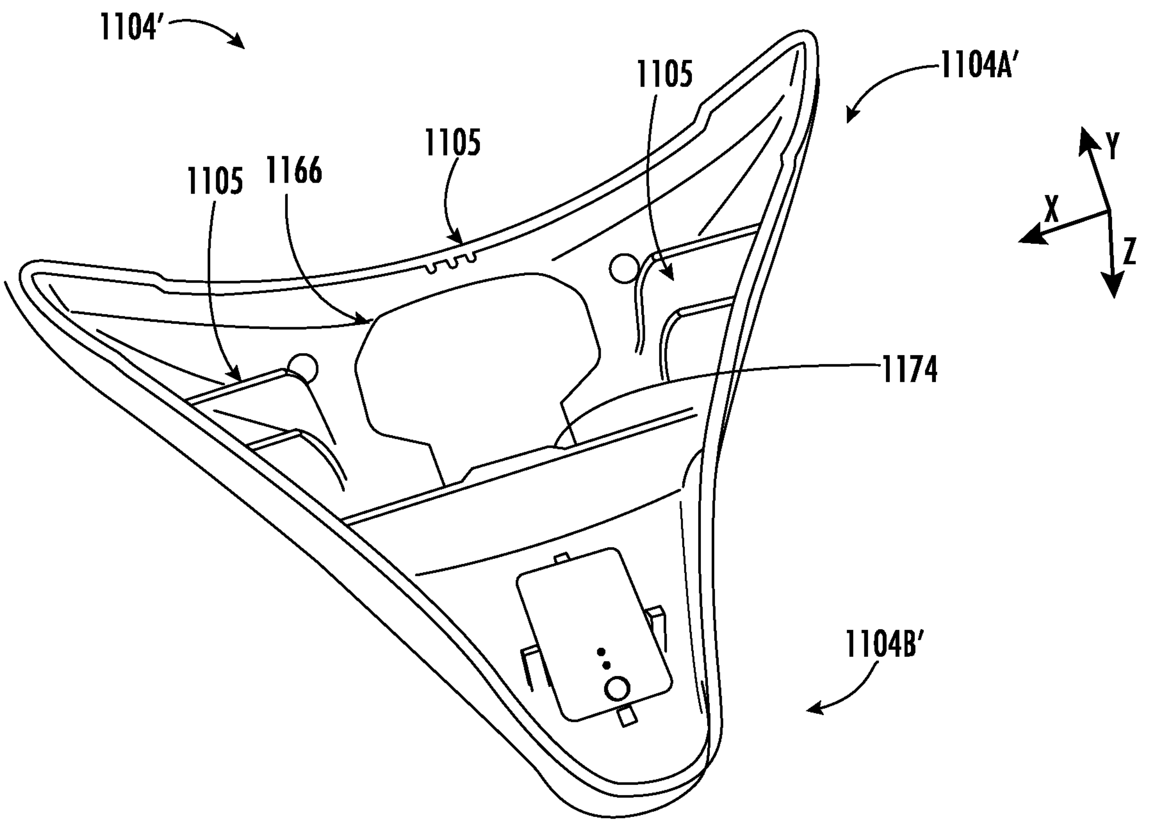
Figure 13:
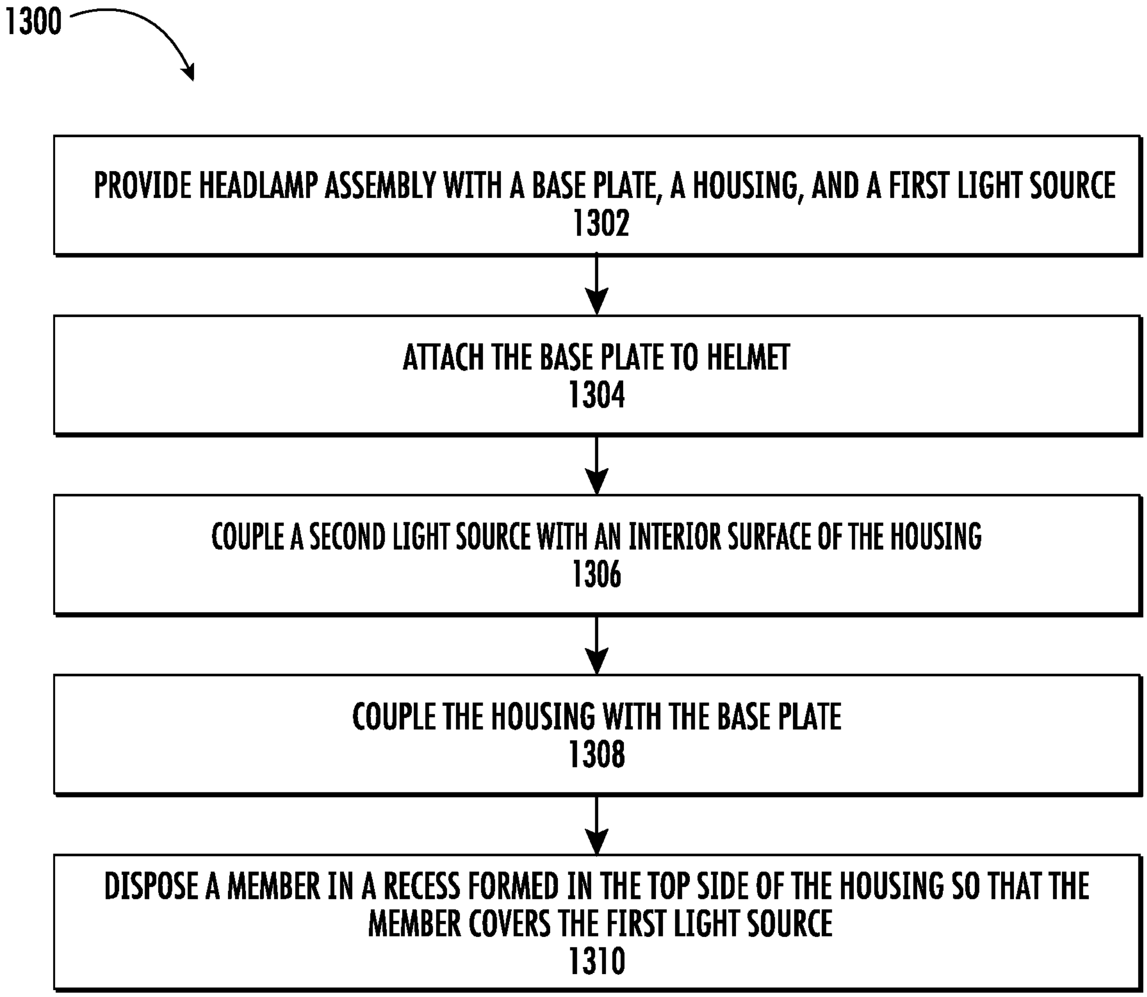

Having thus described some example embodiments in general terms, reference will now be made to the accompanying drawings, which are not necessarily drawn to scale, and wherein:

FIG. 1 is a perspective view of a headlamp assembly in accordance with an embodiment of the present invention;

FIG. 2 is a right side elevation view of the headlamp assembly of FIG. 1;

FIG. 3 is a top plan view of the headlamp assembly of FIG. 1;

FIG. 4 is a front side elevation view of the headlamp assembly of FIG. 1;

FIG. 5 is a bottom side plan view of the headlamp assembly of FIG. 1;

FIG. 6 is a bottom side plan view of the headlamp assembly of FIG. 1 where the base plate is not shown so that other features of the headlamp assembly may be seen;

FIG. 7 is a perspective view of the headlamp assembly of FIG. 1 in which the housing is separated from the base plate and the lateral locking arms are in an open position; and FIGS. 8-9 are exploded views of the headlamp assembly of FIG. 1 from different perspectives;

FIG. 10 is a schematic right side elevation view of a headlamp assembly attached to a helmet worn by a user in accordance with an embodiment of the present invention;

FIG. 11 is a front side elevation view of a headlamp assembly in accordance with yet another embodiment of the present invention;

FIG. 12 is a bottom side perspective view of a housing of a headlamp assembly in accordance with another embodiment of the present invention; and FIG. 13 is a flow chart illustrating steps of a method of attaching a headlamp assembly to a helmet in accordance with an embodiment of the present invention.

Repeat use of reference characters in the present specification and drawings is intended to represent same or analogous features or elements of embodiments of the present invention. In addition, with the exception of the flow chart in FIG. 13, like numbers in the drawings are intended to refer to like features. For example, reference characters 102 and 1102 each refer to a base plate, and reference characters 104, 1104 each refer to a housing.

DETAILED DESCRIPTION OF PREFERRED EMBODIMENTS

Reference will now be made in detail to presently preferred embodiments of the invention, one or more examples of which are illustrated in the accompanying drawings. Each example is provided by way of explanation of the invention, not limitation of the invention. In fact, it will be apparent to those skilled in the art that modifications and variations can be made in the present invention without departing from the scope or spirit thereof. For instance, features illustrated or described as part of one embodiment may be used on another embodiment to yield a still further embodiment. Thus, it is intended that the present invention covers such modifications and variations as come within the scope of the appended claims and their equivalents.

As used herein, terms referring to a direction or a position relative to the orientation of a helmet, headlamp assembly, or components thereof, such as but not limited to "vertical," "horizontal," "upper," "lower," "front," or "rear," refer to directions and relative positions with respect to the helmet's, headlamp assembly's, or component's orientation in its normal intended operation, as indicated in the Figures herein. Thus, for instance, the terms "vertical" and "upper" refer to the vertical direction and relative upper position in the perspectives of the Figures and should be understood in that context, even with respect to an apparatus that may be disposed in a different orientation. The term "substantially," as used herein, should be interpreted as "nearly" or "close to", such as to account for design and manufacturing tolerances of the apparatus.

Moreover, the term "or" as used in this application and the appended claims is intended to mean an inclusive "or" rather than an exclusive "or." That is, unless specified otherwise, or clear from the context, the phrase "X employs A or B" is intended to mean any of the natural inclusive permutations. That is, the phrase "X employs A or B" is satisfied by any of the following instances: X employs A; X employs B; or X employs both A and B. In addition, the articles "a" and "an" as used in this application and the appended claims should generally be construed to mean "one or more" unless specified otherwise or clear from the context to be directed to a singular form. Throughout the specification and claims, the following terms take at least the meanings explicitly associated herein, unless the context dictates otherwise. The meanings identified below do not necessarily limit the terms, but merely provide illustrative examples for the terms. The meaning of "a," "an," and "the" may include plural references, and the meaning of "in" may include "in" and "on." The phrase "in one embodiment," as used herein does not necessarily refer to the same embodiment, although it may. The phrase "at least one of A and B" is satisfied by any of A alone, B alone, A and B alone, and A and B with others.

The phrase "one of A and B" is satisfied by A, whether or not also in the presence of B, and by B, whether or not also in the presence of A.

Embodiments of the present invention relate to improved headlamp assemblies, methods of using such headlamp assemblies, and methods of attaching a headlamp assembly to a helmet. In various embodiments, a headlamp assembly comprises a base plate that can be attached to a helmet (or otherwise to a user's head), a housing that is releasably coupled with the base plate, and multiple light sources. At least one of the light sources can face a forward or anterior direction with respect to the user, and at least one other light source can face a different direction, such as upwards or superior with respect to the user, in order to selectively illuminate a member covering the other light source. The member can be, for example, a badge containing indicia pertaining to an organization to which the user belongs, such as a municipality or firefighting organization. The member can also provide a means to personalize a headlamp assembly using a variety of decorated substrate materials. The headlamp assembly is configured, in various embodiments, to be attached to a helmet and may be particularly useful in environments that are filled with large amounts of smoke, dust, or other material. Various embodiments of the present invention are more useful in such environments than known headlamps that have just one light and that leave any badge on a helmet with poor visibility. Additional aspects of embodiments of the present invention are described in greater detail below.

Although one or more preferred embodiments are discussed herein in the context of helmet-mounted headlamp assemblies, those of skill in the art will appreciate that the present invention is not so limited. In particular, it is contemplated that embodiments of the present invention may be used with any suitable headwear and may in some cases be mounted to the user's head or headwear via a strap.

Turning now to the Figures, FIGS. 1-9 show various views of a headlamp assembly 100 in accordance with an embodiment of the present invention. Headlamp assembly 100 in this embodiment comprises a base plate 102 and a housing 104 that is releasably coupled with base plate 102, as described in greater detail herein. In the illustrated embodiment, headlamp assembly 100 comprises three light sources with different facing directions and is configured to be attached to a helmet, such as the helmet 1058 illustrated in FIG. 10.

In the illustrated embodiment, base plate 102 comprises a first end 102A and a second end 102B opposite the first end 102A, and base plate 102 defines a longitudinal axis 138 (FIG. 7) extending between the first end 102A and the second end 102B. This longitudinal axis 138 extends parallel to the Y-axis in FIG. 1 and may be parallel or, in some cases, colinear with the line defined by the second direction 112A. Base plate 102 also defines a transverse axis 136 (FIG. 7) perpendicular to the longitudinal axis 138 and extending parallel to the X-axis in FIG. 1.

The base plate 102 is configured to be attached to a shell 1060 of a helmet 1058 (FIG. 10). Any suitable method can be used to attach base plate 102 to shell 1060, such as fasteners, one or more straps passing through base plate 102, an adhesive, or through snaps, clips, or the like. The method used to attach base plate 102 to shell 1060 can vary depending on the type or brand of helmet 1058 with which headlamp assembly 100 is used. It is contemplated that, in various embodiments, base plate 102 can be configured to be specific to a particular helmet brand or line of helmets, while housing 104 can be modular and releasably attachable to any base plate 102, regardless of the particular helmet to which base plate 102 is designed to be attached.

More particularly, base plate 102 in this embodiment is curved relative to a plane containing the longitudinal axis 138 and the transverse axis 136. For example, base plate 102 defines a bottom surface 101A and a top surface 101B (FIG. 7), and at least the bottom surface 101A has a curvature corresponding to a curvature of the exterior surface of the shell 1060 of the helmet 1058 to which it is to be attached. Thus, in various embodiments, the bottom surface 101A of the base plate 102 may generally conform to the shape of, or in some cases may rest flush against, the exterior surface of shell 1060. The top surface 101B may have a curvature corresponding to the curvature of the bottom surface 101A and/or to the exterior surface of shell 1060, but surfaces 101A, 101B may have different shapes or curvatures in other embodiments. In some embodiments, base plate 102 also can be tapered from a first portion located at first end 102A of base plate 102 to a second portion located at second end 102B of base plate 102.

In this embodiment, base plate 102 comprises a periphery defining a first lateral side 102C and a second lateral side 102D each extending between the first end 102A and the second end 102B. Although base plate 102 can have any suitably shaped periphery in various embodiments, in this example second end 102B is rounded and the first lateral side 102C and the second lateral side 102D are inwardly curved. For example, here the lateral sides 102C, 102D are inwardly curved towards a plane parallel to the Y-Z plane that extends along the longitudinal axis of base plate 102. Also in this embodiment, first end 102A of the base plate 102 is curved with respect to a plane that is parallel to the X-Z axis and that extends along the transverse axis 136 of base plate 102. As with bottom surface 101A, the periphery of the base plate 102 can conform to a contour of the shell 1060 of the helmet 1058.

Again though, the base plate 102 and the periphery of the base plate 102 can have different shapes in other embodiments. For example, any of second end 102B, first and second lateral sides 102C, 102D, and first end 102A can be linear or curved (whether concave or convex). In various embodiments, base plate 102 also could be configured to resemble a triangle, circle, rectangle, or other shape when viewed in plan.

In this embodiment, base plate 102 also includes a body portion 126C (FIG. 7) as well as a first arm 126A and a second arm 126B each extending laterally outward of the body portion 126C proximate the first end 102A of the base plate 102. As shown, first arm 126A and second arm 126B extend laterally along directions approximately parallel to the transverse axis 136 and/or the X-axis. The first arm 126A and second arm 126B each extend outward of the body portion 126C in opposing directions. In some embodiments, base plate 102 also can be tapered from body portion 126C toward the distal portions of each of first arm 126A and second arm 126B, though in other embodiments base plate 102 has a largely uniform thickness. Base plate 102 further defines a plurality of apertures 127 in this embodiment that can, among other things, allow heat from electrical components disposed in headlamp assembly 100 to dissipate and that may reduce the weight of headlamp assembly 100. Apertures 127 can also be used in some embodiments to facilitate attachment of base plate 102 to a helmet.

Similar to base plate 102, housing 104 in this embodiment extends between a first end 104A and a second end 104B. In this embodiment, housing 104 defines a top side 104C, a first lateral side 104D, a second lateral side 104E, and a front side 104F. Front side 104F is positioned proximate first end 104A of housing 104. Top side 104C is spaced apart from base plate 102 when the housing 104 is coupled to base plate 102, and second lateral side 104E is generally positioned opposite first lateral side 104D. Top side 104C of housing 104 defines a first aperture 106, and front side 104F of housing 104 defines a second aperture 108. When housing 104 is coupled to base plate 102 as described in more detail below, first end 104A and front side 104F of housing 104 are located proximate to first end 102A of base plate 102. Bottom edges of first lateral side 104D, second lateral side 104E, and front side 104F of housing 104 are disposed against the top surface 101B of base plate 102 when housing 104 is coupled with base plate 102. In this embodiment, first end 104A and front side 104F of housing 104 are curved with respect to a plane that is parallel to the X-Z plane and that extends along the transverse axis 136. Although not required in all embodiments, the peripheral shape of housing 104 may correspond to the peripheral shape of base plate 102, or vice versa.

In the illustrated example, housing 104 comprises a body 184 and a first extended portion 103A and a second extended portion 103B that each extend laterally outward in opposite directions from body 184. Extended portions 103A, 103B are positioned proximate the first end 104A of the housing 104 in this embodiment but could be proximate second end 104B in other embodiments. First extended portion 103A and second extended portion 103B extend laterally along directions approximately parallel to the transverse axis 136 in this embodiment, but they also can be angled or curved relative thereto in other embodiments. Also, as described in greater detail below, in this embodiment housing 104 also comprises a removable plate 105 that is coupled with body 184. Certain features of headlamp assembly 100 are described below with respect to removable plate 105, but those of skill in the art will appreciate that, in other embodiments, the features provided via or with respect to plate 105 also could be provided via or with respect to housing 104 body 184.

As with base plate 102, housing 104 in this embodiment is curved relative to a plane containing the longitudinal axis 138 and the transverse axis 136. This curvature allows the housing 104 to conform to the shape of base plate 102 and/or to the shape of a shell 1060 of a helmet 1058. Also in this embodiment, housing 104 is tapered from a first portion located at the first end 104A (e.g., proximate front surface 104F) toward a second portion located at the second end 104B. Further, housing 104 in this embodiment is tapered away from the central portion of body 184 and toward each extended portion 103A, 103B, respectively.

As noted above, housing 104 preferably is releasably coupled with and removable from base plate 102. In various embodiments, one or both of housing 104 and base plate 102 could define a plurality of teeth, tab, snaps, clips, screws, or other suitable fasteners that engage corresponding slots or receptacles on the other of housing 104 or base plate 102. In one preferred embodiment, however, housing 104 is releasably coupled with base plate 102 at least in part via a pair of locking arms that each define laterally extending tabs that are secured in slots. As described below, in one embodiment, the locking arms are coupled with housing 104 and the slots are defined in base plate 102, but in other embodiments the reverse configuration could be used.

In this regard, housing 104 comprises a first locking arm 114A and a second locking arm 114B, shown in FIG. 1 in a locked position and in FIG. 7 in an open position. In the locked position, locking arms 114A, 114B generally do not extend outwardly relative to lateral sides 104D, 104E of housing 104 and instead are part of, adjacent to, or flush with lateral sides 104D, 104E. In the open position, locking arms 114A, 114B extend outwardly relative to lateral sides 104D, 104E of the housing 104 so that they are spaced apart from lateral sides 104D, 104E. To move locking arms 114A, 114B between the locked position and the open position, a user can grasp the distal portion of each locking arm 114A, 114B and move it in the appropriate direction as indicated by line A1. As illustrated in FIGS. 6-7, locking arms 114A, 114B each include a respective tab. Locking arm 114A includes a first tab 130A and locking arm 114B includes a second tab 130B. Tabs 130A, 130B in this embodiment are positioned so that they extend inwardly towards the center of the housing 104, and they can extend, for example, along a plane that is parallel with the plane containing the longitudinal and transverse axes 138, 136.

Referring specifically to FIG. 5, locking arms 114A, 114B are configured to engage with respective slots 128A, 128B defined in base plate 102. For example, when locking arms 114A, 114B are in the locked position shown, tab 130A extends into slot 128A, and tab 130B extends into slot 128B. In some embodiments, tabs 130A, 130B may engage the walls of slots 128A, 128B to create further interference preventing housing 104 from being separated from base plate 102. When locking arms 114A, 114B are moved to the open position, tabs 130A, 130B are moved out of slots 128A, 128B. As a result, housing 104 readily can be separated from base plate 102.

Additionally, as best seen in FIGS. 7-9, either or both of housing 104 and base plate 102 can comprise one or more locating features that are configured to locate and align the two components relative to one another such that tabs 130A, 130B can engage slots 128A, 128B. For example, in the illustrated embodiment, base plate 102 comprises several protrusions 129 that extend from the top surface 101B of base plate 102. Protrusions 129 are shaped to engage correspondingly shaped recesses formed in the bottom side of housing 104 such that, when protrusions 129 are received in the recesses, housing 104 is in the proper position with respect to base plate 102 so that locking arms 114A, 114B can be closed to move tabs 130A, 130B into slots 128A, 128B without interference. In some embodiments, one or more of the protrusions 129 may snap fit with its corresponding recess, though that is not required.

In various embodiments, headlamp assembly 100 comprises a plurality of light sources, such as two, three, or more light sources. In the illustrated embodiment, headlamp assembly 100 comprises three light sources. More particularly, headlamp assembly 100 comprises a first light source 110, a second light source 112, and a third light source 118. Light sources 110, 112, and 118 may each comprise one or more light emitting diodes (LEDs) or arrays of LEDs. The light sources 110, 112, and 118 can be configured to generate light having intensities, different colors, color temperatures, etc. Additionally or alternatively, covers for the light sources 110, 112, 118 can cause the emitted light to have different colors, color temperatures, etc.

First light source 110 is coupled with housing 104 and, more particularly, in this embodiment is disposed between housing 104 and plate 105, as best seen in FIGS. 8-9. Plate 105 defines the first aperture 106 in this embodiment, and first light source 110 preferably is disposed and oriented so that it emits light through first aperture 106 along a first direction 110A (FIG. 1) away from base plate 102. First direction 110A in this embodiment is perpendicular to a plane comprising the transverse axis 136 and the longitudinal axis 138, and this plane can be parallel to the plane containing the X-Y axis. Where plate 105 is not provided, first light source 110 can be disposed between housing 104 and base plate 102, and first aperture 106 can be defined in body 184 of housing 104.

Second light source 112 is disposed and, in some cases, fixed between the housing 104 and the base plate 102. Second light source 112 preferably is disposed and oriented to emit light through the second aperture 108 along a second direction 112A (FIG. 1) away from the headlamp assembly 100. Second direction 112A in this embodiment is perpendicular to a plane containing the X-Z axis.

Third light source 118 in this embodiment is positioned proximate second end 102B of base plate 102. Third light source 118 comprises a light source cover 118A that preferably is transparent or translucent and can be tinted in some embodiments to alter the light generated by third light source 118. For example, light source cover 118A can be red in color in one embodiment. By providing the light from third light source 118 with a distinct color or color temperature, third light source 118 may be more easily detected by others in smoky or foggy environments. This may be particularly helpful for firefighters or rescue teams searching for others in extreme conditions. Of course, light source cover 118A also provides additional protection for third light source 118, e.g., against damage from water, dirt, loose material within the housing, etc.

As noted above, various embodiments of headlamp assembly 100 also preferably comprise a member 142, which may be or comprise a badge, insignia, or the like and which comprises indicia. Member 142 can show that the wearer of headlamp assembly 100 belongs to a particular organization, such as a fire department, government entity, company, etc., or it could comprise a nametag or some other indicia. In the illustrated embodiment, member 142 is generally circular in shape, but that is not required and member 142 can be any suitable shape in other embodiments.

Member 142 preferably is disposed on the top side 104C of the housing 104 and over the first aperture 106, such that first light source 110 is beneath member 142. Some or all portions of member 142 may be translucent so that light from first light source 110 shines through and/or around member 142 to illuminate member 142 and any indicia thereon. In this specific example, plate 105 comprises a rim 123 that defines a recess 124A inside of the rim 123, and member 142 is disposed in recess 124A. In other embodiments, however, member 142 can be coupled with the top side 104C of housing 104 by any suitable method and need not be disposed in a recess.

In preferred embodiments, member 142 is removable and replaceable with another member 142, for instance bearing a different insignia or indicia. In this regard, member 142 is disposed in recess 124A beneath a light source cover 124 that is connected with the top side 104C of housing 104 to selectively cover member 142. The light source cover 124, which preferably is formed of a transparent plastic or glass material, can be connected to body 184 of housing 104 in a variety of ways, including via threads, hinge, snap fit, etc. In the illustrated embodiment, however, light source cover 124 defines a tab 124B (FIGS. 8-9) at one end that is received in a corresponding slot in rim 123, and light source cover 124 is held in place at the end diametrically opposite the tab 124B by a retainer lock 122A. As described below, by actuating retainer lock 122A, the user can remove light source cover and access member 142.

In this regard, as best seen in FIG. 1, retainer lock 122A is generally cylindrical in this embodiment and is received in a correspondingly cylindrical recess 120 defined in plate 105. In recess 120, retainer lock 122A is rotatable about a longitudinal axis parallel to the Z-axis. Referring also to FIGS. 8-9, retainer lock 122A comprises a slot 122B defined in its top surface and a cutoff portion 122C. The slot 122B is engageable by a screwdriver, a finger or a fingernail, or another instrument to cause rotation of the retainer lock 122A about its longitudinal axis. The cutoff portion 122C is a planar surface extending in parallel with the longitudinal axis of retainer lock 122A, such that, when viewed in plan, retainer lock 122A resembles a circle from which a circular segment has been removed.

As noted above, retainer lock 122A is designed to selectively interfere with removal of light source cover 124 and thereby keep member 142 in place. Accordingly, in this embodiment member 142 can define a notch 142A that is sized so that, when member 142 is disposed within recess 124A, it does not overlap with retainer lock 122A and thereby retainer lock 122A can rotate within recess 120 without contacting member 142. However, in this embodiment, light source cover 124 has a larger diameter than member 142, and light source cover 124 and retainer lock 122A are preferably positioned to partially overlap. Specifically, retainer lock 122A defines a circumferential groove 122D sized to receive a generally flat or linear peripheral edge 124C of light source cover 124. Circumferential groove 122D extends about almost the entire circumference of retainer lock 122A, except in the location of cutoff portion 122C. When retainer lock 122A is in the position shown in FIG. 1, the peripheral edge 124C of light source cover 124 is received in groove 122D, and light source cover 124 is held in place over member 142. If retainer lock 122A is rotated 180 degrees about its longitudinal axis, the peripheral edge 124C of light source cover 124 is no longer in groove 122D and instead faces cutoff portion 122C. The flat peripheral edge 124C does not interfere with cutoff portion 122C when light source cover 124 is lifted upward, and thus with retainer lock 122A in this position, light source cover 124 can be removed and member 124 can be accessed, positioned, and/or replaced. To lock the light source cover 124 in the closed position, light source cover 124 can be repositioned in the recess 124A and then the retainer lock 122A may be rotated so that the cutoff portion 122C is positioned away from peripheral edge 124C of light source cover 124.

In various embodiments, headlamp assembly 100 comprises one or more actuators to selectively illuminate its various light sources. Although any suitable actuator(s) can be used in various embodiments, including switches, sliders, and dials, in a preferred embodiment headlamp assembly 100 comprises at least one button 116. In one embodiment, button 116 is large in size to accommodate a user wearing gloves. Regardless, as is well understood, when a user presses button 116, one or more of light sources 110, 112, and/or 118 will turn off or on. In various embodiments, different sequences of button 116 presses and/or lengths of time held can cause headlamp assembly 100 to operate in different lighting modes (e.g., to selectively illuminate one or more of light sources 110, 112, and/or 118 in different sequences, patterns, colors, frequencies, and/or intensities). For example, a user pressing button 116 a single time can cause operation in a first mode, pressing button 116 twice in short succession can cause operation in a second mode, and pressing button 116 three times in short succession can cause operation in a third mode, and so forth. Of course, in other embodiments, button 116 can be configured to cause operation of the light sources 110, 112, and/or 118 of headlamp assembly 100 in various modes via different button 116 press sequences or lengths of time held. For instance, if the user presses, but does not hold, button 116, the light sources of headlamp assembly 100 can operate in a first mode; if the user presses and holds button 116 for a longer period of time, the light sources of headlamp assembly 100 can operate in a second mode, and if the user presses and holds button 116 for an even longer period of time, the light sources of headlamp assembly 100 can operate according to a third mode.

A variety of different modes of operation for the light sources of headlamp assembly 100 are contemplated. As one example, in one mode, second light source 112 is turned on to emit light along the second direction 112A and a light source associated with the button 116 may also be turned on, but other light sources 110, 118 may be turned off. In another mode, each of first light source 110, second light source 112, and third light source 118 are turned on. In yet another mode, second light source 112 remains off while other light sources 110, 118 are turned on. In a further mode, any of first light source 110, second light source 112, and/or third light source 118 are caused to blink periodically at a predetermined frequency. In some modes, some or all of the light sources 110, 112, and/or 118 are illuminated with a low intensity to conserve battery, and, in other modes, some or all of these light sources are turned on with a high intensity to optimize the brightness of the headlamp assembly 100. However, each of these modes are merely exemplary, and other modes are also possible.

Although not required, in some embodiments some or all portions of the button 116 can be transparent or translucent, and the transparent or translucent portions of the button 116 can be illuminated by a light source positioned underneath the button 116 when the headlamp assembly 100 is turned on, such as second light source 112. In some embodiments, the color, color temperature, or intensity of the color for light emitted at the button 116 may be different depending on a mode of operation for the headlamp assembly 100. For example, the button may be illuminated in a first color (e.g., red) when operating in a first mode, the button may be illuminated in a second color (e.g., blue) when operating in a second mode, the button may be illuminated in a third color (e.g., green) when operating in a third mode, and so forth. Alternatively, the button may be illuminated in different colors based on a condition of the headlamp assembly 100, such as when the headlamp assembly 100 is low on battery. Additionally or alternatively, the light generated at the button 116 may be flashed in intervals to indicate a mode or a condition. For example, when the battery for a headlamp assembly 100 is low, the light may flash, and the light may flash at a greater frequency when the battery is extremely low.

In various embodiments, headlamp assembly 100 has a small form factor and a less bulky appearance when attached to a helmet. Non-limiting examples of dimensions that could be used for headlamp assembly 100 are as follows. The distance from the first end 102A of the base plate 102 to the second end 102B of the base plate 102 along the longitudinal axis 138 may be about 6 inches or less, about 5 inches or less, or even about 4 inches or less. Furthermore, in some embodiments, the distance from the distal end of first arm 126A of base plate 102 to the distal end of second arm 126B of base plate 102 along a direction parallel to the transverse axis 136 may be about 6 inches or less, about 5 inches or less, or even about 4 inches or less. Furthermore, the thickness of headlamp assembly 100 proximate to the front side 104F of the housing 104 may be about 2 inches or less, about 1.5 inches or less, or about 1 inch or less—this thickness may be measured in a direction substantially parallel to the Z-axis. As noted, the thickness at second end 104B may be smaller than the thickness at the front side 104F in some embodiments.

Certain internal components of headlamp assembly 100 are described with reference to the exploded views of FIG. 8-9. For example, housing 104 comprises or defines a battery receptacle 146A where batteries 146 are received, and a battery cover 132 is releasably coupled with battery receptacle 146A. Of course, batteries 146 are not required and other power sources could be used in other embodiments. Second light source 112 is disposed within a light source housing 134 proximate to the second aperture 108 when the headlamp assembly 100 is fully assembled. Also disposed within light source housing 134 in this embodiment is a substrate 148 on which one or more light sources (e.g., LEDs) are disposed and that can form second light source 112. As those of skill in the art will appreciate, substrate 148 comprises circuitry that is configured to control these light sources of light source 112. Substrate 148 also preferably comprises circuitry to control light sources 110 and 118, whether alone or in combination with another printed circuit board in headlamp assembly 100. Substrate 148 is in electrical communication with batteries 146 and various light sources 110, 112, and 118 in headlamp assembly 100. Housing 134 defines an aperture 108A that is aligned with second aperture 108 when headlamp assembly 100 is assembled and through which light from the light source 112 may pass.

Additionally, as shown, second light source 112 comprises a reflector 154 that generally surrounds one or more light sources on substrate 148 and a light cover 152 disposed radially outward thereof. Reflector 154 surrounds aperture 108A on the side internal to housing 134. Light cover 152 may be or comprise an optical element such as a lens, diffuser, or the like, or may simply be a transparent protective sheet through which light can pass and that serves to protect the light from damage and/or debris. Light cover 152 in this embodiment has a flat front surface that, when light cover 152 is disposed within housing 134, completely covers aperture 108A.

Second light source 112 also comprises a removable light source cover 150 in this embodiment that is coupled with housing 104 proximate to the front side 104F of the housing 104 and is disposed over the second aperture 108. As with light cover 152, light source cover 150 may be or comprise an optical element such as a lens, diffuser, or the like, or may simply be a transparent protective sheet through which light can pass and that serves to protect the light from damage. The covers 150, 152 may be tinted in some embodiments to alter the light that is generated.

The metho by which plate 105 is coupled with body 184 of housing 104 also is shown in FIGS. 8-9. Specifically, in this embodiment, plate 105 comprises a plurality of posts 105A, and plate 105 is positioned relative to body 184 so that the posts 105A are each received in a corresponding aperture 109 defined in the body 184. Suitable fasteners may be coupled with the distal ends of apertures 109 on the underside of body 184 to retain the plate 105 in an appropriate position relative to body 184. Also, body 184 defines a recess 107 where plate 105 is received with light source 110 disposed thereunder.

FIG. 10 is a schematic right side elevation view of a headlamp assembly 1056 attached to a helmet 1058 worn by a user. The helmet 1058 comprises a shell 1060 including a front portion 1062A, a rear portion 1062B, and a first lateral portion 1062C. Shell 1060 includes a second lateral portion (not shown) opposite first lateral portion 1062C. First lateral portion 1062C and second lateral portion separate front portion 1062A and rear portion 1062B. As shown, headlamp assembly 1056 is attached to helmet 1058 so that base plate 102 within the headlamp assembly 1056 is attached to the shell 1060 with the first end 102A of the base plate 102 located at the front portion 1062A of the shell 1060.

A first light source 1010 of headlamp assembly 1056 is configured to emit light along a first direction 1010A. A second light source 1012 of the headlamp assembly 1056 is configured to emit light along a second direction 1012A. In some embodiments, light from the second light source 1012 defines a path 1012B, and path 1012B can have a shape similar to a right cylindrical cone—where this is the case, the second direction 1012A can form a centerline for the path 1012B. The light from second light source 1012 has a maximum intensity along second direction 1012A, and the intensity of light may become smaller at greater angles away from second direction 1012A. The path 1012B also defines a beam angle Θ1, and this beam angle Θ1 can be measured from two rays on opposing sides of the second direction 1012A that have about fifty percent of the intensity of light along the second direction 1012A. While some spill light may be emitted outside of path 1012B, a significant amount of the light is emitted within path 1012B. The beam angle Θ1 may be less than about 120 degrees, less than about 90 degrees, less than about 60 degrees, or about 30 degrees. Light from other light sources may also disperse within a path having a similar shape at varying dispersion angles. First direction 1010A associated with first light source 1010 can be separated from second direction 1012A associated with the second light source 1012 by an angle Θ2. The angle Θ2 may be about 45 degrees to about 135 degrees in some embodiments, about 60 degrees to about 120 degrees in some embodiments, about 75 degrees to about 105 degrees, or about 90 degrees.

Alternative embodiments of a headlamp assembly are described with reference to FIGS. 11-12. FIG. 11 is a front side elevation view of a headlamp assembly 1100 in accordance with yet another embodiment of the present invention. FIG. 12 is a bottom side perspective view of a housing 1104' of a headlamp assembly in accordance with another embodiment of the present invention. The headlamp assemblies of these embodiments receive a removable headlamp or other flashlight 1180 that is installed between a housing 1104, 1104' and a base plate 1102 of the headlamp assembly 1100. In these embodiments, flashlight 1180 comprises a light source 1182 analogous to second light source 112 described above, except flashlight 1180 is removable from housing 1104 and can be separately worn by a user. Thus, the headlamp assemblies of these embodiments need not comprise a second light source 112 and the associated internal components described above.

More particularly, in the embodiment of FIG. 11, base plate 1102 is similar to the base plate 102 described above and comprises a first end 1102A and an opposite second end 1102B. Base plate 1102 is configured to be attached to the shell 1060 of a helmet 1058 (FIG. 10) with first end 1102A of base plate 1102 located at front portion 1062A of shell 1060.

Housing 1104 of headlamp assembly 1100 as depicted in FIG. 11 is similar in some respects to housing 104 described above, but it is modified as described herein to accommodate a removable flashlight 1180. FIG. 12 illustrates a different housing embodiment denoted 1104'. IN general, housings 1104, 1104' preferably are releasably coupled to the base plate 1102 and extend between a first end 1104A and a second end 1104B. Housings 1104, 1104' also each define a top side 1104C, a first lateral side 1104D, a second lateral side 1104E opposite the first lateral side 1104D, and a front side 1104F.

Headlamp assembly 1100 can define a first aperture 1106 at the top side 1104C of the headlamp assembly 1100 in some embodiments. Where the first aperture 1106 is included, it allows light from a first light source to be emitted through the first aperture 1106 so that the light shines through or around a member (e.g., analogous to member 142) positioned in a recess 1124A. In other embodiments, however, the first aperture 1106, first light source, and/or the member may be omitted. Where the first aperture 1106 and first light source are not included but the member is included, the member can be provided in recess 1124A without having any light shine through the member.

Housings 1104, 1104' also each define a second aperture 1166 proximate to a front side 1104F of housing 1104, 1104'. When flashlight 1180 is coupled between housing 1104, 1104' and base plate 1102, second light source 1182 of flashlight 1180 is disposed and oriented to emit light through the second aperture 1166 away from the headlamp assembly 1100. Referring to FIG. 12, which shows the bottom side of housing 1104', flashlight 1180 can be, for example, snap fit into a correspondingly-shaped recess defined in the bottom side of housing 1104' and, in some cases, need not be supported by base plate 1102. Housing 1104' in this embodiment defines several protrusions 1105 that extend radially inward from the interior bottom walls of housing 1104'. Protrusions 1105 are defined to correspond to the shape of the flashlight 1180 that is to be inserted in housing 1104' and thus serve to locate and position flashlight 1180 in housing 1104'. Thereby, when the flashlight 1180 is received in the recess, flashlight 1104' is in the proper position with respect to housing 1104' so that its light source 1182 is aligned with second aperture 1166. Those of skill in the art can select suitable features to define the snap fit and suitable protrusions 1105 depending on the dimensions of the flashlight 1180 that is to be used with housing 1104'.

The headlamp assembly 1100 housings 1104, 1104' also comprises an optional finger 1174 that is coupled with housing 1104 at its proximal end and the distal end of which engages a button on flashlight 1180 when flashlight 1180 is inserted in housings 1104, 1104'. Finger 1174, where provided, extends towards the second aperture 1166 along a direction that is substantially parallel to the Y-axis. The distal end of finger 1174 defines a button area 1116 that, when pressed by a user, causes the distal end of finger 1174 to engage the button on the flashlight 1180. In other embodiments, finger 1174 need not be provided, and in these embodiments, the user actuates flashlight 1180 by directly pressing its button.

Embodiments of the present invention also provide methods for using a headlamp assembly and for attaching a headlamp assembly to a helmet. An example of a method performed in accordance with one embodiment of the present invention is provided below with reference to the flowchart shown in FIG. 13. The method 1300 is used to attach a headlamp assembly to a helmet begins at operation 1302. At operation 1302, a headlamp assembly is provided that comprises a base plate, a housing, and a first light source. In this embodiment, the base plate comprises a first end and a second end opposite to the first end. The base plate defines a longitudinal axis extending between the first end and the second end and a transverse axis perpendicular to the longitudinal axis. The longitudinal axis and transverse axis define a first plane containing the two axes. In addition, a second plane is defined that extends perpendicularly to the first plane and that contains the longitudinal axis, and a third plane is defined that extends perpendicularly to the first plane and the second plane.

The housing defines a top side and a front side. The top side comprises an internal surface facing the base plate and an external surface opposite the internal surface. The front side extends between the top side and the first end of the base plate. The first light source is coupled with the housing, and the first light source has a first facing direction perpendicular to the first plane.

At operation 1304, the base plate is attached to a helmet. The base plate preferably is attached to the helmet with the first end of the base plate located at the front portion of the helmet. At operation 1306, a second light source is coupled with an interior surface of the housing. At operation 1308, the housing is coupled with the base plate. This is done so that the second light source has a second facing direction that is perpendicular to the third plane. At operation 1310, a member is disposed in a recess formed in the top side of the housing so that the member covers the first light source.

Based on the foregoing, it will be appreciated that embodiments of the invention provide improved headlamp assemblies and methods of use and attachment. Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Moreover, although the foregoing descriptions and the associated drawings describe exemplary embodiments in the context of certain exemplary combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. In cases where advantages, benefits or solutions to problems are described herein, it should be appreciated that such advantages, benefits and/or solutions may be applicable to some example embodiments, but not necessarily all example embodiments. Thus, any advantages, benefits or solutions described herein should not be thought of as being critical, required or essential to all embodiments or to that which is claimed herein. Although specific terms are employed herein, they are used in a generic and descriptive sense only and not for purposes of limitation.

What is claimed is:

1. A headlamp assembly for attachment to a helmet, the helmet comprising a shell defining a front portion, a rear portion, two lateral portions separating the front portion from the rear portion, the headlamp assembly comprising:

a base plate comprising a first end and an opposite second end, wherein the base plate defines a longitudinal axis extending between the first end and the second end and a transverse axis perpendicular to the longitudinal axis, wherein the base plate is configured to be attached to the shell with the first end of the base plate located at the front portion of the shell;

a housing releasably coupled with the base plate, the housing defining a top side spaced apart from the base plate, a first lateral side, an opposite second lateral side, and a front side, the top side defining a first aperture and the front side defining a second aperture, and wherein the front side is located at the first end of the base plate;

a first light source coupled with the housing and oriented to emit light through the first aperture away from the base plate;

a second light source disposed within the housing and oriented to emit light through the second aperture away from the headlamp assembly; and a member removably positioned on the top side of the housing and disposed over the first aperture.

2. The headlamp assembly of claim 1, wherein the base plate defines a bottom surface and a top surface, wherein the bottom surface has a first curvature corresponding to a second curvature of the exterior surface of the shell.

3. The headlamp assembly of claim 2, wherein bottom edges of the first lateral side, the second lateral side, and the front side of the housing are disposed against the top surface of the base plate when the housing is releasably coupled with the base plate.

4. The headlamp assembly of claim 1, the base plate further comprising a body portion and opposite first and second arms each extending laterally outward of the body portion proximate the first end of the base plate.

5. The headlamp assembly of claim 4, wherein the base plate is curved relative to a plane containing the longitudinal axis and the transverse axis.

6. The headlamp assembly of claim 4, wherein the housing is tapered from a first portion located at the first end of the base plate to a second portion located at the second end of the base plate.

7. The headlamp assembly of claim 6, wherein the headlamp assembly is tapered along the first arm and along the second arm.

8. The headlamp assembly of claim 1, wherein the member comprises first indicia.

9. The headlamp assembly of claim 1, wherein the member is translucent.

10. The headlamp assembly of claim 1, wherein the member is disposed in a recess defined in the top side of the housing.

11. The headlamp assembly of claim 10, the housing further comprising a first light source cover hingedly connected with the housing proximate to the top side of the housing to selectively cover the member disposed in the recess and a second light source cover releasably coupled with the housing proximate to the front side of the housing and disposed over the second aperture.

12. A headlamp assembly for attachment to a helmet, the headlamp assembly comprising:

a base plate comprising a periphery, the periphery defining a first end and an opposite second end, wherein the base plate defines a longitudinal axis extending between the first end and the second end and a transverse axis perpendicular to the longitudinal axis, wherein the periphery of the base plate conforms to a contour of the helmet;

a first plane containing the longitudinal axis and the transverse axis, a second plane extending perpendicularly to the first plane and containing the longitudinal axis, and a third plane extending perpendicularly to the first and second planes;

a housing releasably coupled with the base plate, the housing defining a top side spaced apart from the base plate and a front side extending between the top side and the first end of the base plate;

a first light source coupled with the housing, the first light source having a first facing direction that is perpendicular to the first plane;

a second light source disposed between the housing and the base plate, the second light source having a second facing direction that is perpendicular to the third plane; and a member removably coupled with the housing and disposed over the first light source.

13. The headlamp assembly of claim 12, further comprising a third light source coupled with the housing proximate the second end of the base plate.

14. The headlamp assembly of claim 12, wherein the first and second light sources each comprise distinct LEDs or arrays of LEDs.

15. The headlamp assembly of claim 12, wherein the housing further defines a first lateral side and a second lateral side, and wherein the housing comprises a first locking arm coupled with the first lateral side and a second locking arm coupled with the second lateral side.

16. The headlamp assembly of claim 15, wherein the base plate comprises a first slot and a second slot, the first locking arm defines a first tab, and the second locking arm defines a second tab, the first and second locking arms being moveable relative to the housing between a first position, at which the first and second locking arms are adjacent the respective first and second lateral sides, the first tab is disposed in the first slot, and the second tab is disposed in the second slot, and a second position, at which the first and second locking arms are spaced apart from the respective first and second lateral sides and the first and second tabs are not disposed in the respective first and second slots.

17. The headlamp assembly of claim 15, wherein the front side of the housing and the first end of the base plate are curved with respect to the third plane.

18. The headlamp assembly of claim 15, the base plate periphery further defining first and second lateral sides each extending between the first end and second end, wherein the second end is rounded and wherein the first and second lateral sides are inwardly curved toward the second plane.

19. A method of attaching a headlamp assembly to a helmet, the method comprising:

providing a headlamp assembly comprising:

a base plate comprising a first end and an opposite second end, wherein the base plate defines a longitudinal axis extending between the first end and the second end and a transverse axis perpendicular to the longitudinal axis;

a first plane containing the longitudinal axis and the transverse axis, a second plane extending perpendicularly to the first plane and containing the longitudinal axis, and a third plane extending perpendicularly to the first and second planes;

a housing, the housing defining a top side and a front side, the top side comprising an internal surface facing the base plate and an external surface opposite the internal surface, the front side extending between the top side and the first end of the base plate; and a first light source coupled with the housing, the first light source having a first facing direction that is perpendicular to the first plane;

attaching the base plate to the helmet with the first end of the base plate located at a front portion of the helmet;

coupling a second light source with an interior surface of the housing; and coupling the housing with the base plate such that the second light source has a second facing direction that is perpendicular to the third plane.

20. The method of claim 19, further comprising disposing a member in a recess formed in the top side of the housing such that the member covers the first light source.

* * * * *